N. V. CHRISTENSEN

March 3, 1931. FEED OFF THE ARM SEWING MACHINE Re. 17,988

Original Filed Oct. 20, 1926 4 Sheets-Sheet 1

Inventor
Norman V. Christensen
By
Stewart & Mason
Attorneys

March 3, 1931.

N. V. CHRISTENSEN

FEED OFF THE ARM SEWING MACHINE

Re. 17,988

Original Filed Oct. 20, 1926

4 Sheets-Sheet 2

Inventor

Norman V. Christensen

By

Stockvant & Mason

Attorneys

N. V. CHRISTENSEN

March 3, 1931. FEED OFF THE ARM SEWING MACHINE Re. 17,988

Original Filed Oct. 20, 1926 4 Sheets-Sheet 3

Inventor

Norman V. Christensen

By

Sturtevant Mason

Attorneys

N. V. CHRISTENSEN

March 3, 1931.

FEED OFF THE ARM SEWING MACHINE

Re. 17,988

Original Filed Oct. 20, 1926 4 Sheets-Sheet 4

Inventor

Norman V. Christensen

By

Sturtevant Mason

Attorneys

Reissued Mar. 3, 1931

Re. 17,988

UNITED STATES PATENT OFFICE

NORMAN V. CHRISTENSEN, OF CHICAGO, ILLINOIS, ASSIGNOR TO UNION SPECIAL MACHINE COMPANY, OF CHICAGO, ILLINOIS, A CORPORATION OF ILLINOIS

FEED-OFF-THE-ARM SEWING MACHINE

Original No. 1,718,411, dated June 25, 1929, Serial No. 142,939, filed October 20, 1926. Application for reissue filed December 6, 1929. Serial No. 412,270.

The invention relates to new and useful improvements in a sewing machine of the type shown in the application of Norman V. Christensen and Harold J. Le Vesconte, filed February 16, 1925, Serial No. 9,584, patented December 24, 1929, No. 1,741,095. The machine of the prior application is particularly adapted for stitching tubular parts, such as sleeves or the leg portions of a garment. The work supporting arm is suspended by a depending member, which in turn is carried by the overhanging portion of a bracket. The main shaft is directly above this depending member and projects over the upper end thereof so that the looper mechanism and the feeding mechanism in the work supporting arm may be operated by devices actuated by the main shaft, which are comparatively few in number. In this prior machine, the work supporting arm is located in a vertical plane which cuts a vertical plane containing the main shaft at an acute angle.

An object of the present invention is to provide a machine of the above type wherein the depending member is inclined away from the supporting bracket so as to increase the clearance space for the arm of the operator between said depending member and the bracket on which the sewing machine unit is mounted.

A further object of the invention is to provide a machine of the above type wherein the work supporting arm is disposed in a vertical plane which is substantially parallel with the vertical plane containing the main shaft.

In the drawings which show by way of illustration one embodiment of the invention:—

Figure 1:
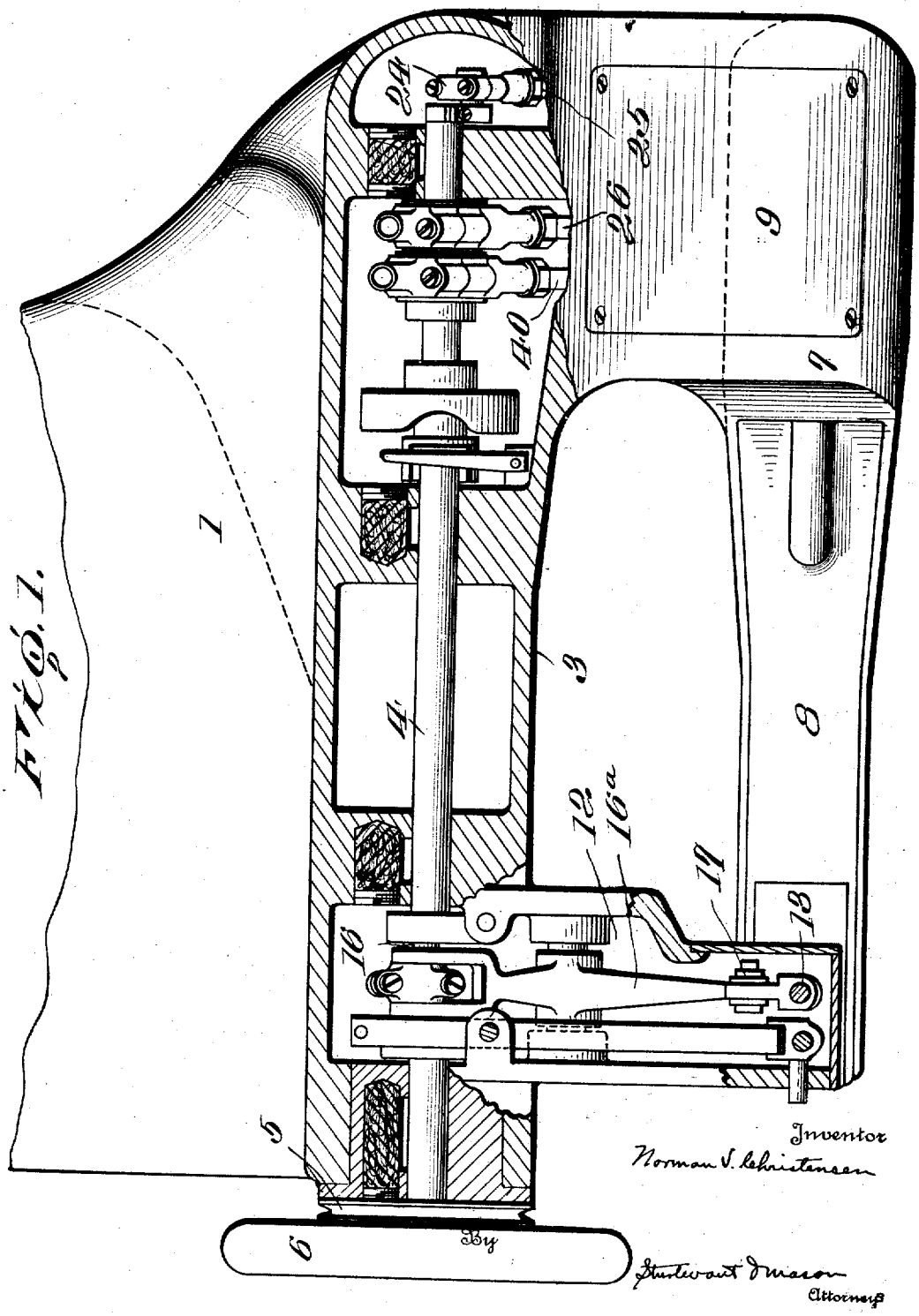
Figure 1 is a view partly in plan and partly in horizontal section showing a sewing machine embodying the improvements.
Figure 2:
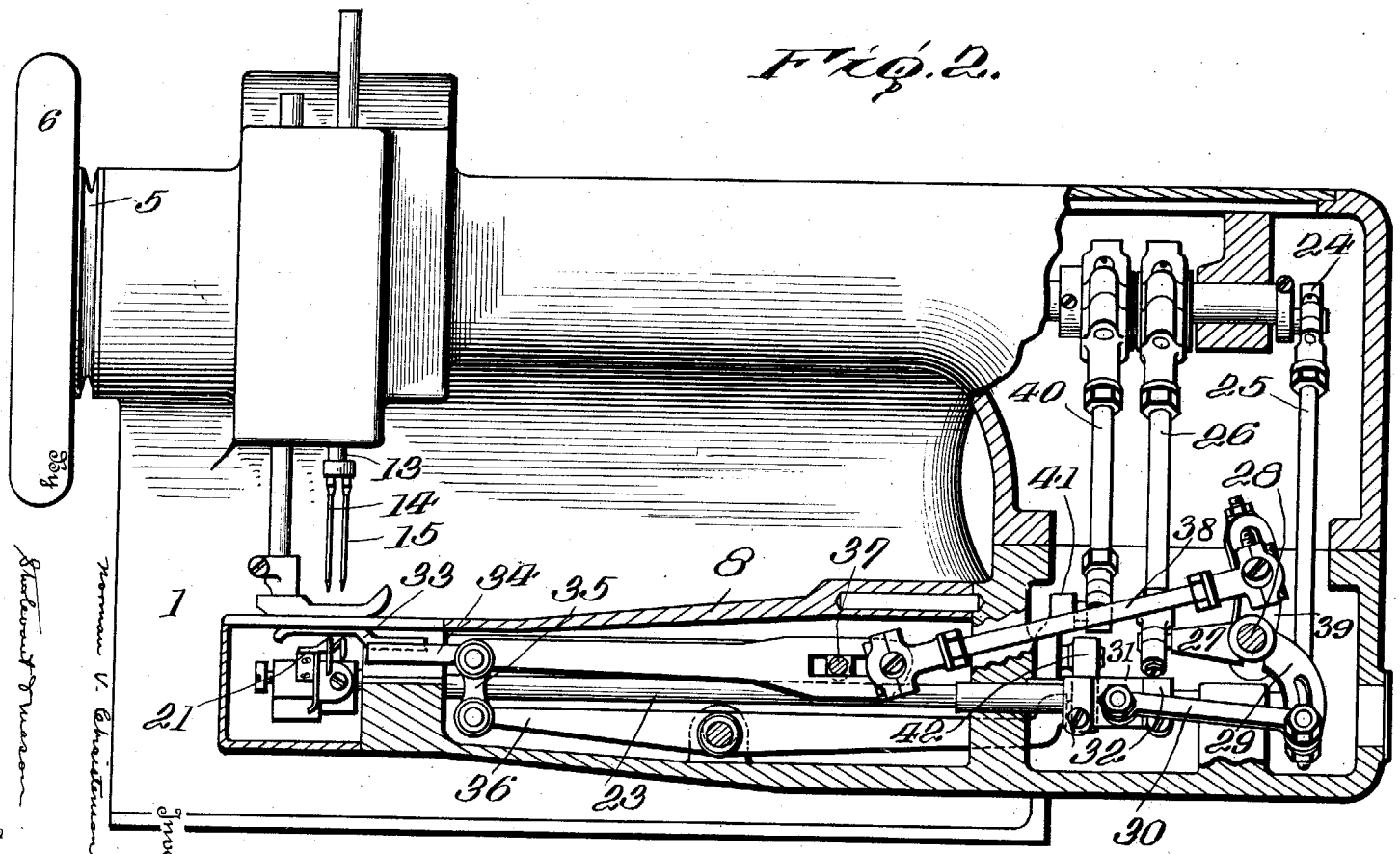
Fig. 2 is a view partly in section and partly in side elevation of the machine.
Figure 3:
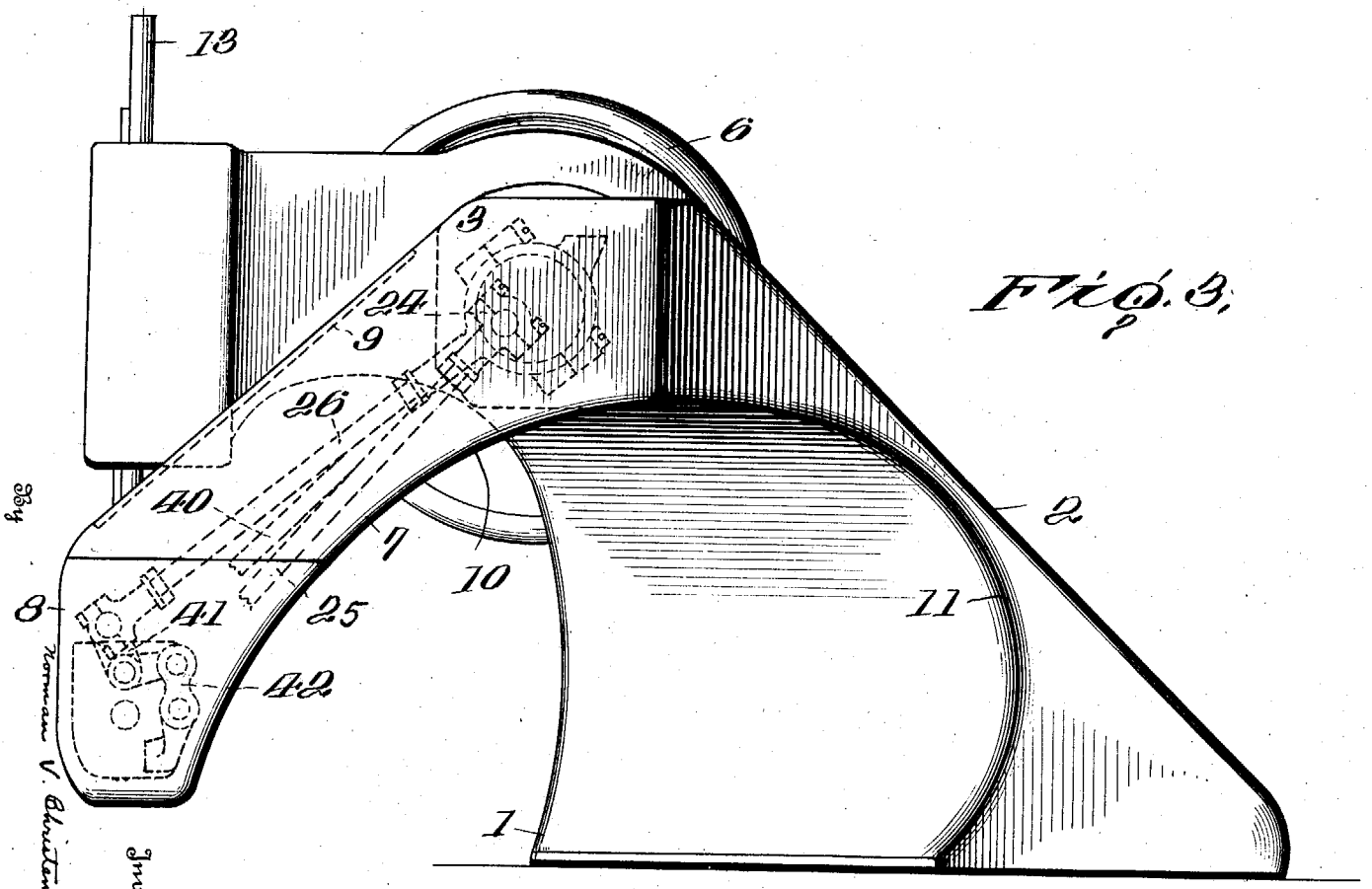
Fig. 3 is a view of the machine taken from the end of the work supporting arm where it is supported.
Figure 4:
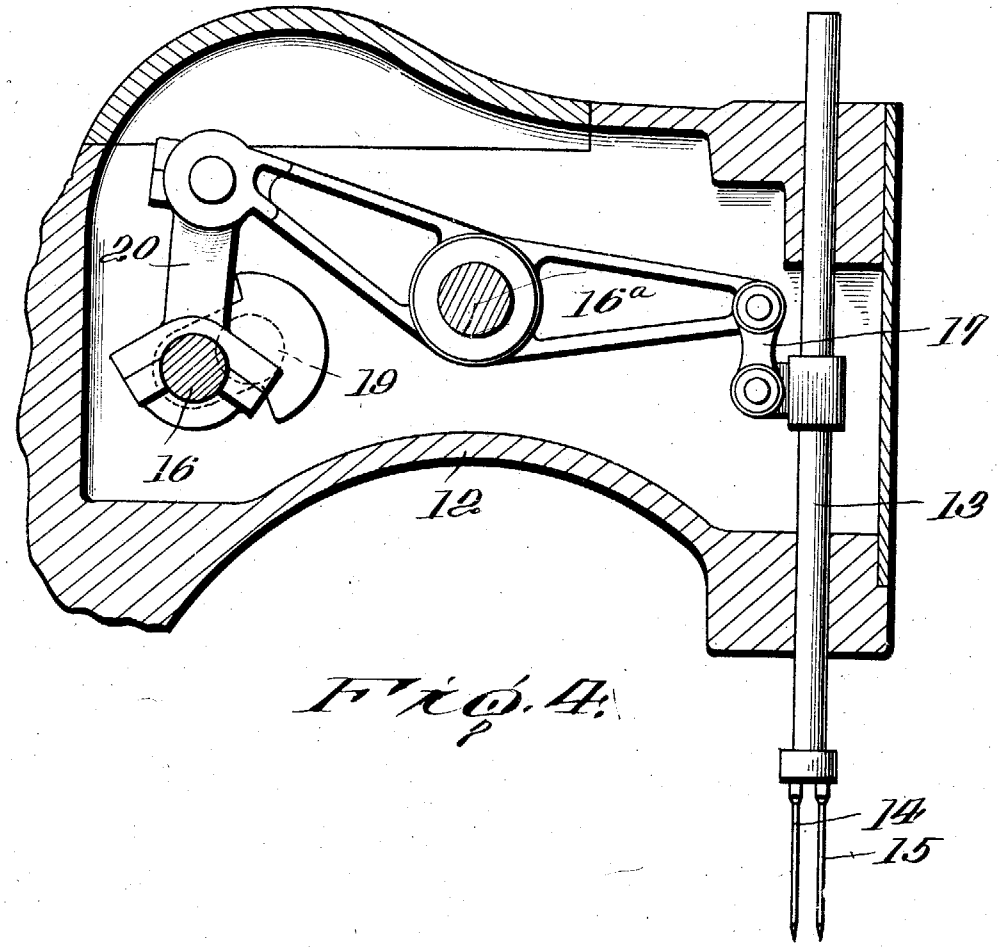
Fig. 4 is a sectional view through the housing for supporting the needle bar and showing the actuating mechanism therefor.

The invention is directed broadly to a sewing machine which is adapted for stitching tubular articles, such as sleeves or the leg portions of garments. To this end, the machine is provided with a work supporting arm around which the material may be formed into a tubular portion and this tubular portion as it is formed, is fed along the arm by a feeding mechanism and is stitched as the material leaves the end of the work supporting arm. The work supporting arm is suspended so that the material can pass underneath the same and be formed around the arm into tubular shape. The main frame of the machine contains an upper frame member forming a part of an overhanging bracket base, and located in this frame member is the main actuating shaft. At one end of this frame member carrying the actuating shaft, is an inclined depending member, and at the lower end of the depending member is a work supporting arm. The work supporting arm projects laterally from this depending member, and the longitudinal axis of this work supporting arm lies in a vertical plane offset from, but parallel with the vertical plane containing the main shaft, or substantially so. The actuating mechanism for the looper and the feed, which are located in this work supporting arm, is located in this inclined depending member, and a single train of mechanism may be used for oscillating the looper shaft from the main actuating shaft, and in fact, all of the operating parts for the looper and the feed, operate either in planes at right angles to the main actuating shaft, or in planes parallel to the vertical plane containing the actuating shaft. The bracket base is similar to that shown and described in the application filed by Messrs. Christensen and Le Vesconte above referred to, and the face thereof adjacent the work supporting arm is curved. This curved face leads into a curved face on the underside of the depending member, and together therewith forms an archway through which the arm of the operator may be extended for guiding the articles as they are being stitched. At the free end of the work supporting arm is the needle bar, and this needle bar is mounted in the supporting structure carried by the supporting frame at the upper outer edge of the bracket base. The needle bar is actuated from the main shaft. The main shaft is preferably provided with a belt wheel at the end thereof adjacent the needle bar.

Referring more in detail to the drawings, the improved machine consists of a bracket supporting base 1 which is adapted to be attached to a sewing table in any desired way. This bracket supporting base has an upwardly projecting part 2 which terminates at its upper outer edge in a supporting frame 3. Located in this supporting frame 3 is a main actuating shaft 4. The main actuating shaft 4 carries a belt wheel 5 by which it is rotated, and adjacent the belt wheel 5 is a hand wheel 6 of the usual construction. At the opposite end of the supporting frame 3 from the belt wheel 5, there is an inclined depending member 7, and this inclined depending member 7 carries a work supporting arm 8 at the lower end thereof. The upper face 9 of this depending member 7 is inclined substantially at an angle of forty-five degrees to the vertical. This angle, of course, may be varied. It will readily be seen that this inclination of the depending member accomplishes two results. It offsets the work supporting arm 8 from a vertical plane containing the actuating shaft so that the operator sitting adjacent the supported end of the work supporting arm may get a clear vision of the free end of the work supporting arm where the stitching takes place. This inclining of the depending member greatly increases the range of visibility of the work supporting arm; that is, the operator may see the work supporting arm at a point quite close to the depending member and thus more efficiently guide the edges of the sections of fabric which are to be stitched into tubular form. While the machine is particularly adapted for forming tubular parts, it will be understood, of course, that it may be used for the stitching of any articles, and it is particularly useful where the stitching may pass directly from one article on to another, so that there may be a substantially continuous flow of the articles from the machine passing along and off from the end of the work supporting arm.

The under face 10 of the depending portion which carries the work supporting arm is curved, and the face 11 of the supporting bracket base is likewise curved, and these two curves unite to form an archway, which gives a very roomy space for the arm of the operator to guide the material at the inner face of the work supporting arm. This face of the supporting bracket base is more widely spaced from the work supporting arm at the end thereof where it is supported than at the free end of the work supporting arm. This is accomplished by the shaping of the supporting bracket base. It is necessary to provide ample room for the arm of the operator at the supported end of the work supporting arm. At the free end, however, of the work supporting arm, it is only necessary to have proper clearance for the material to pass. While the work supporting arm is shown as spaced at a considerable distance from the bracket carrying the same, it will be understood that this spacing may be changed, provided sufficient space is afforded for properly guiding the material. At the end of the supporting frame 3 adjacent the driving pulley, there is a laterally projecting housing 12 which is preferably formed as an integral part of the supporting frame for the main driving shaft. This laterally projecting housing 12 extends over the free end of the work supporting arm 8. Mounted in this housing 12 is a needle bar 13, carrying, as shown in the drawings, two needles, 14 and 15. The needle bar is actuated by a lever 16*a* connected by a link 17 to the needle bar, and this lever is in turn actuated by a crank 16 in the main actuating shaft 4 through a link 20 which is connected to the lever.

Cooperating with the needles beneath the work support are two loopers 21. There is a separate looper for each needle, and thus the machine as illustrated is particularly adapted for forming two independent parallel lines of stitching. It will be understood, of course, that this stitching mechanism may be widely varied, so as to adapt the machine to different characters of stitching. The loopers 21 are carried by a looper shaft 23 mounted in suitable bearings in the work supporting arm 8. Mounted on the end of the main actuating shaft 4 is an eccentric member 24, and a link 25 connected to this eccentric member 24, is in turn connected to an arm on the looper supporting shaft 23 for oscillating the looper supporting shaft. It will be noted that the main actuating shaft can be connected directly to the looper supporting shaft, and that the plane in which this actuating link 25 lies and moves is at right angles to the axis of both the actuating shaft and the looper supporting shaft. It is understood, of course, that this looper actuating mechanism may be varied to derive the desired movements for the looper, but there will always be the advantage of these parts which transmit the movements from one shaft to the other being in a plane at right angles to the axis of the shaft, so that there can be no cramping or objectionable angular thrusts brought to bear on the looper supporting shaft. The looper supporting shaft is moved endwise by means of a pitman 26 cooperating with an eccentric on the main actuating shaft 4. This pitman is connected to an arm 27 carried by a rock shaft 28. The rock shaft 28 carries an arm 29 which is connected by a link 30 to a collar 31 on the looper supporting shaft 23. This collar 31 is freely mounted on the looper supporting shaft and is located between spaced collars 32, 32 fixed to the looper supporting shaft. This mechanism gives an endwise movement to the looper supporting shaft, and thus imparts the needle avoiding movement to the loopers.

The material is fed along the work support by a feed dog 33 carried by a feed bar 34. The feed bar 34 is pivotally mounted on a link 35 supported by a lever 36. The feed bar slides on a fulcrum pivot pin 37 and is moved endwise by means of a link 38 connected to an arm 39 on the rock shaft 28. Thus it is that this rock shaft 28 moves the feed bar endwise, and also the looper endwise. The plane of movement of the parts carried by the rock shaft 28 is parallel with the axis of the actuating shaft. The feed bar is raised and lowered by a pitman 40 cooperating with an eccentric on the main actuating shaft 4. This pitman 40 is connected to a rock lever 41 mounted on a stud carried by the frame of the machine. Said rock lever carries another arm to which a link 42 is connected, and the link 42 at its lower end is connected to the lever 36. This rock lever 41 oscillates about an axis parallel with the longitudinal axis of the main actuating shaft.

From the above it will be apparent that the actuating parts move in planes either parallel to the longitudinal axis of the main shaft or at right angles thereto, and this brings about the advantages above referred to.

It will be apparent that this feeding mechanism may be varied so as to provide a differential feed for certain classes of work. It will also be obvious that the actuating mechanism for the needles, the loopers and the feed may be varied, and the shaping of the frame parts and the proportions thereof may be varied, without departing from the spirit of the invention as set forth in the appended claims.

Having thus described the invention, what I claim as new and desire to secure by Letters Patent, is:—

1. A sewing machine comprising a substantially horizontal frame, a main actuating shaft mounted in said frame and carrying at one end thereof an actuating member, the other end of said shaft being enclosed within said frame, a bracket base on which said supporting frame is mounted, said base being located at one side of a vertical plane passing through the longitudinal axis of the shaft and attached to said frame from end to end thereof, a member depending from the end of said frame enclosing the actuating shaft, said member being inclined away from said base and spaced therefrom so as to provide a clearance space between said depending member and the bracket base for the arm of the operator, a work supporting arm carried at the lower end of said depending member and extending in a direction substantially parallel with the longitudinal axis of said actuating shaft and means for supporting the needle bar over the free end of the work supporting arm.

2. A sewing machine comprising a substantially horizontal member, a main actuating shaft carried thereby and extending longitudinally thereof, a needle head at one end of said horizontal member, a needle actuating mechanism in said head operated from said main shaft, a member depending from the other end of said horizontal member, a bracket base on which said horizontal member is mounted, said base being located at one side of a vertical plane passing through the longitudinal axis of the shaft and attached to said horizontal member from end to end thereof, said depending member being inclined away from said base and spaced therefrom so as to provide clearance space between said depending member and the bracket base for the arm of the operator, a work supporting arm carried at the lower end of said depending member and extending in the general direction of the actuating shaft and terminating beneath said needle head.

In testimony whereof, I affix my signature.

NORMAN V. CHRISTENSEN.